United States Patent [19]
Rice

[11] Patent Number: 6,028,509
[45] Date of Patent: Feb. 22, 2000

[54] VOICE ACTIVATED VEHICLE ALARM SYSTEM

[76] Inventor: David Rice, 8516 Dowitcher Way, Antelope, Calif. 95843

[21] Appl. No.: 09/044,690

[22] Filed: Mar. 18, 1998

[51] Int. Cl.[7] ...................................................... B60Q 1/00
[52] U.S. Cl. ........................ 340/449; 340/438; 340/425.5
[58] Field of Search ................................ 340/449, 425.5, 340/426, 438, 588, 581, 589, 540

[56] References Cited

U.S. PATENT DOCUMENTS

| | | | |
|---|---|---|---|
| 4,760,379 | 7/1988 | De Phillipo et al. ..................... | 340/507 |
| 5,054,686 | 10/1991 | Chuang .................... | 236/49.3 |
| 5,260,684 | 11/1993 | Metzmaker ........................ | 340/457.1 |
| 5,311,746 | 5/1994 | Dombrowski et al. .................... | 62/131 |
| 5,382,941 | 1/1995 | Arzoumanian .......................... | 340/426 |
| 5,451,930 | 9/1995 | McDaniel ................................ | 340/521 |
| 5,509,852 | 4/1996 | Clark ........................................... | 454/75 |
| 5,510,765 | 4/1996 | Madau ........................................ | 340/541 |
| 5,539,290 | 7/1996 | Lu et al. ................................. | 318/565 |
| 5,680,096 | 10/1997 | Grasmann ............................... | 340/426 |
| 5,682,134 | 10/1997 | Stallbohm ............................... | 340/426 |
| 5,793,291 | 8/1998 | Thornton ................................. | 340/573 |

Primary Examiner—Jeffery A. Hofsass
Assistant Examiner—Toan Phan
Attorney, Agent, or Firm—Theodore J. Bielen, Jr.

[57] ABSTRACT

An alarm system for the interior of a vehicle utilizing a temperature sensor measuring the interior temperature of the vehicle and producing a signal when a certain level of temperature is reached. A sound detector also produces a second signal representative of a certain sound intensity within the interior of the vehicle. An AND gate circuit receives the signals from the temperature sensor and the sound detector and generates an output signal. Alarm means is triggered by the output signal of the AND gate circuit.

11 Claims, 3 Drawing Sheets

VOICE ACTIVATED VEHICLE ALARM SYSTEM

BACKGROUND OF THE INVENTION

The present invention relates to a novel and useful alarm system for the interior of a vehicle.

Vehicle intrusion alarms are commonplace in the transportation field. Normally, an alarm is triggered when the vehicle is accidently or intentionally moved, or a window or door from the vehicle is opened in an unauthorized manner. Alarms in the present systems are visual or audio, and are activated for a certain period of time and reactivated until an authorized person disarms the same.

Many types of detection, alarm, and security systems have been devised for vehicles. For example, U.S. Pat. No. 5,311,746 detects temperature within a vehicle and triggers the ventilation system to purge the air in the vehicle.

U.S. Pat. No. 5,451,930 shows a combination of alarm which is triggered when the door of a vehicle is ajar, the temperature of the vehicle interior reaches a certain level, or the occupant of the vehicle triggers the alarm to indicate an emergency.

U.S. Pat. No. 5,510,765 shows a motor vehicle security sensor system which is sensitive to sound, vibration, and motion within a motor vehicle in order to determine glass breakage.

Situations have occurred in which persons have left an infant or pet within a car and adequate ventilation has not been provided causing the interior of the vehicle to overheat, such a condition has often produced fatal results.

An alarm system which takes these two conditions into consideration would be a notable advance in the field of vehicle security.

SUMMARY OF THE INVENTION

In accordance with the present invention a novel and useful alarm system for the interior of a vehicle is herein provided.

The alarm system of the present invention utilizes temperature sensor means for measuring the temperature of the interior of the vehicle. The temperature sensor means includes the capability of producing an electrical signal representative of a temperature at a predetermined temperature level in the vehicle. For example, the temperature level may be commensurate with one that is lower than a temperature level considered to be dangerous, i.e. one causing suffocation of a living entity.

A sound detector is also utilized in the system of the present invention to produce an electrical signal representative of a certain sound intensity within the interior of the vehicle. In addition, the sound detector may be adjusted to produce such signal when the sound acquired by such detector lies at pitch levels corresponding to those of a pet or a child. The intensity threshold for the production of such a signal from the sound detector may also be adjustable.

AND gate means may also be found in the present invention for receiving the signals from the temperature sensor and the sound detector. The AND gate generates an output signal upon receipt of both of these signals.

Alarm means is also included in the present invention for producing an alert upon receipt of the output signal from the AND gate means. The alert may be an audio signal, or any other signal which may be detected by the human senses or through other means such as electronic sensing, ultrasonic sensing, and the like. The alert may be maintained for a predetermined period of time by timer means. The timer means would, thus, operate for a preset period of time following triggering of the alarm means by the AND gate means output signal. In addition, means may also be included for pulsating the audio or visual alert to draw more attention to the alert. Moreover, the alarm system timer means may latch for a predetermined period of time following triggering of the alarm.

It may be apparent that a novel and useful alarm system for the interior of a vehicle has been herein provided.

It is therefore an object of the present invention to provide an alarm system for the interior of a vehicle which is responsive to the combination of a high temperature condition as well as a sound intensity condition which may be produced by a living entity therein.

Another object of the present invention is to provide an alarm system for the interior of a vehicle which is only triggered when both a high temperature and high sound condition is achieved within the interior of a vehicle and may be employed in conjunction with other alarm systems existing in a vehicle.

A further object of the present invention is to provide an alarm system for the interior of a vehicle which is responsive to both high temperature and high sound conditions which may be easily retrofitted into existing vehicle alarm systems.

Yet another object of the present invention is to provide an alarm system for the interior of a vehicle which is relatively inexpensive to manufacture and install in new or existing vehicles.

The invention possesses other objects and advantages especially as concerns particular characteristics and features thereof which will become apparent as the specification continues.

For a better understanding of the invention reference is made to the following detailed description of the preferred embodiments thereof which should be referenced to the hereinabove described drawings.

DETAILED DESCRIPTION OF THE PREFERRED EMBODIMENTS

Various aspects of the present invention will evolve from the following detailed description of the preferred embodiments should be taken in conjunction with the prior delineated drawings.

Figure 1:
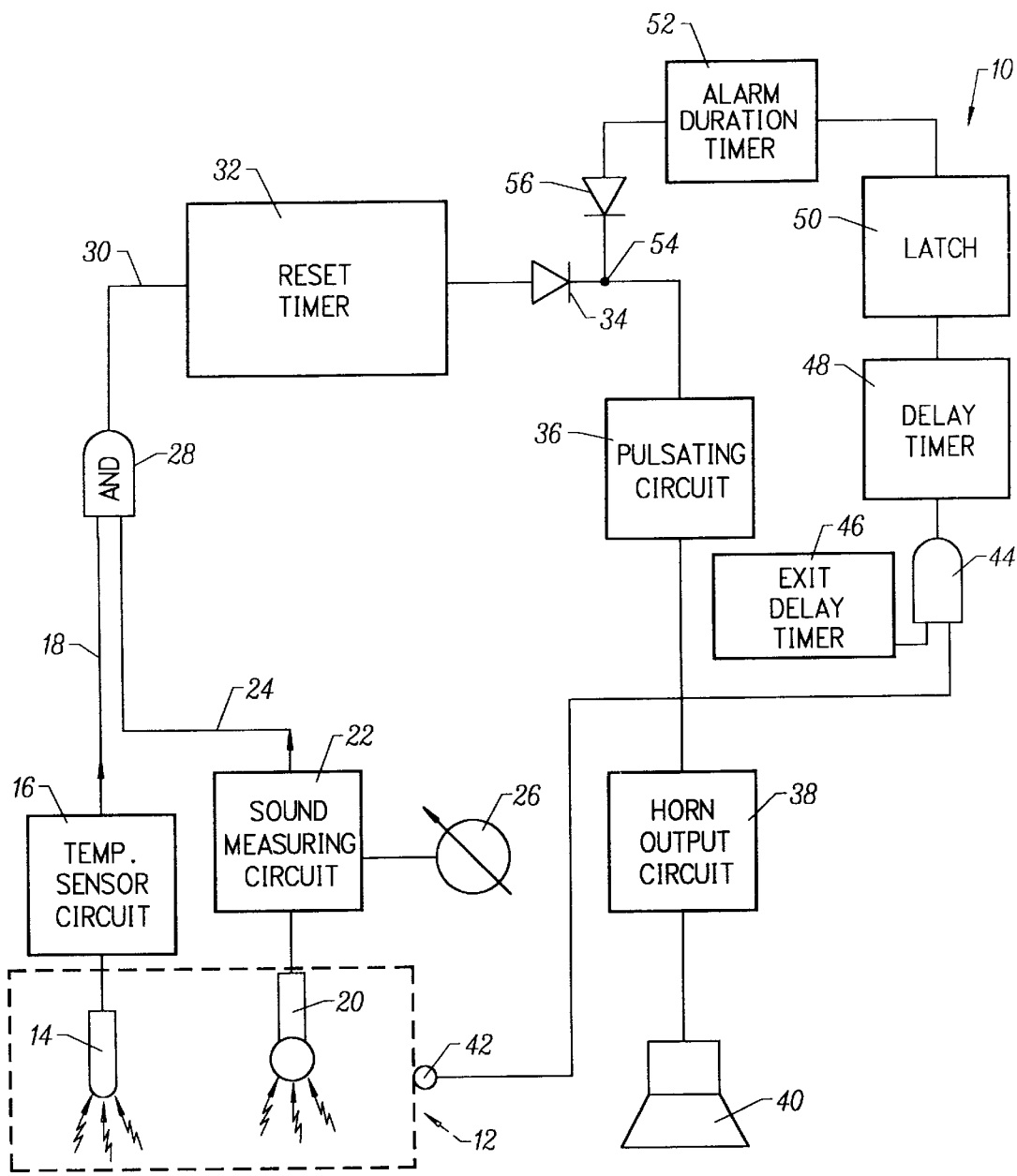
FIG. 1 is a schematic block diagram showing the operation of the overall system in a vehicle.

The invention as a whole is shown in the drawings by reference character 10. System 10 is employed to indicate an unsafe condition in the interior of a vehicle 12, depicted in dashed line in FIG. 1. For example, vehicle 12 may contain a child, a pet, or similar living entity. When vehicles, such as vehicle 12, are placed outdoors in a sunny area, the interior of vehicle 12 becomes quite hot and uncomfortable. In addition, there have been known cases of suffocation of living entities due to improper ventilation within vehicle 12 when it has been exposed to the sun. Alarm 10 includes as one its elements a temperature sensor 14 which transduces a heat measurement into an electrical signal that is received by temperature measuring circuit 16. Circuit 16 produces a signal output along signal leg 18 when a certain preset and predetermined temperature is reached within vehicle 12.

In addition, the present invention includes a microphone or sound sensor 20 which is also capable of detecting the noise level within vehicle 12 and, in certain cases, noise emanating at a certain pitch within vehicle 12. The transduced sound signal forms an electrical signal and is received by sound measuring circuit 22 which produces an output signal along leg 24. Adjustment means 26 is capable of setting the level of sound or the pitch of sound to which sound sensor or microphone 20 is responsive.

The signals from output legs 18 and 24 from temperature sensor 14 and sound sensor 20, respectively, travels to AND gate 28. When both signals from legs 18 and 24 are received by AND gate 28, AND gate generates an output signal along leg 30 which passes to reset timer 32. The output of reset timer 32 carries through blocking diode 34 and travels to pulsating circuit 36. Pulsating circuit 36 generates a signal which enters the output circuit 38 of horn 40.

In conjunction with the dual sensing alarm of the present invention, a prior conventional door signal alarm is also depicted in the drawings of the present application. A door signal 42 is generated when the door of vehicle 12 is opened in an unauthorized manner. In other words, door signal 42 indicates the opening of the door while the vehicle 12 is armed. A signal passes to AND gate 44 which also receives a signal from the exit delay timer 46, that is part of such conventional system. The AND gate passes a signal to the delay timer 48. From this point, the signal goes through latch 50 and alarm duration timer 52, passing to node 54 via diode 56. Thus, the alarm system of the present invention is compatible with existing alarms in vehicles.

Figure 2A:
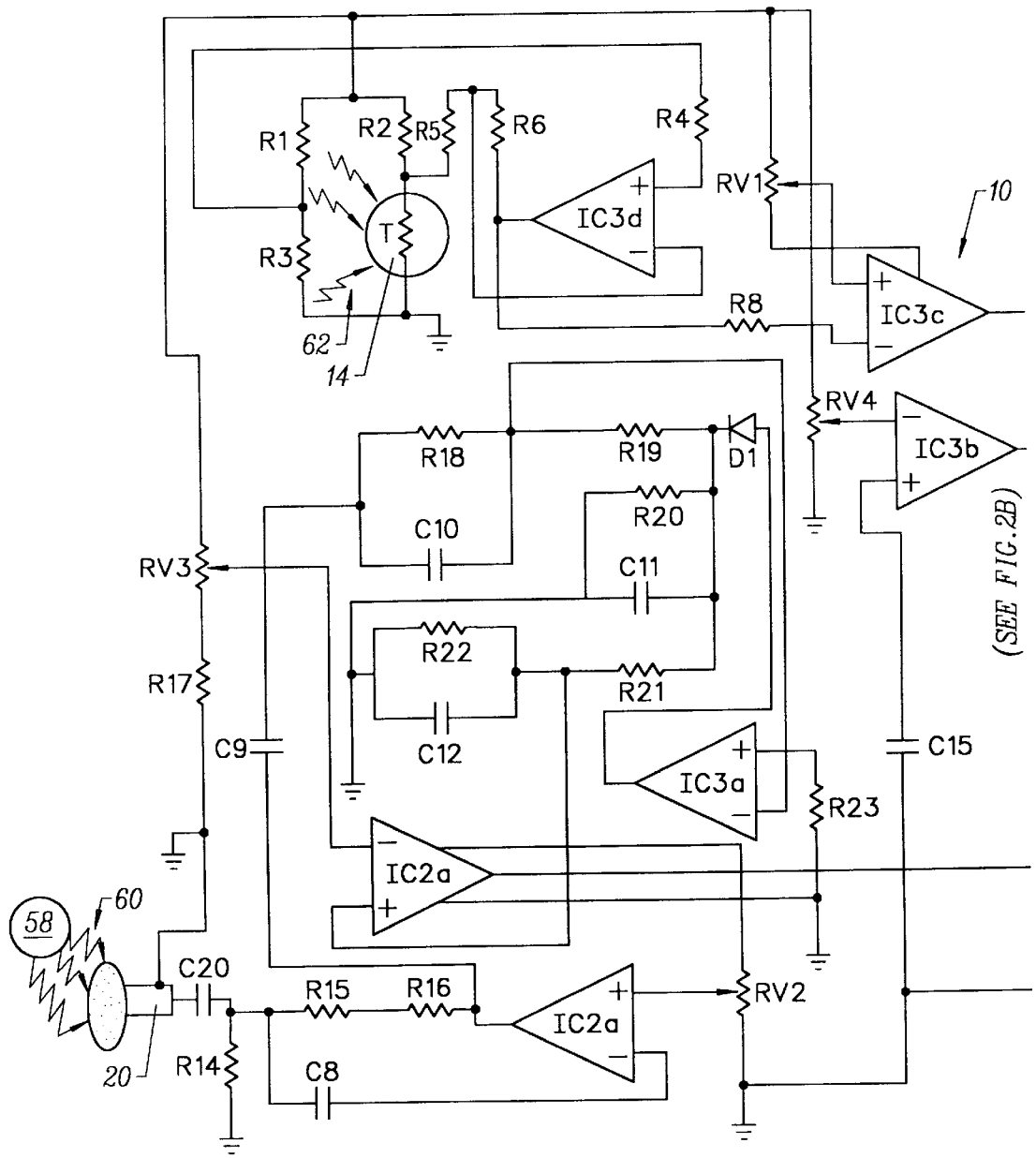
FIG. 2 is an electrical schematic diagram of the alarm system of the present invention for use in a vehicle.
Figure 2B:
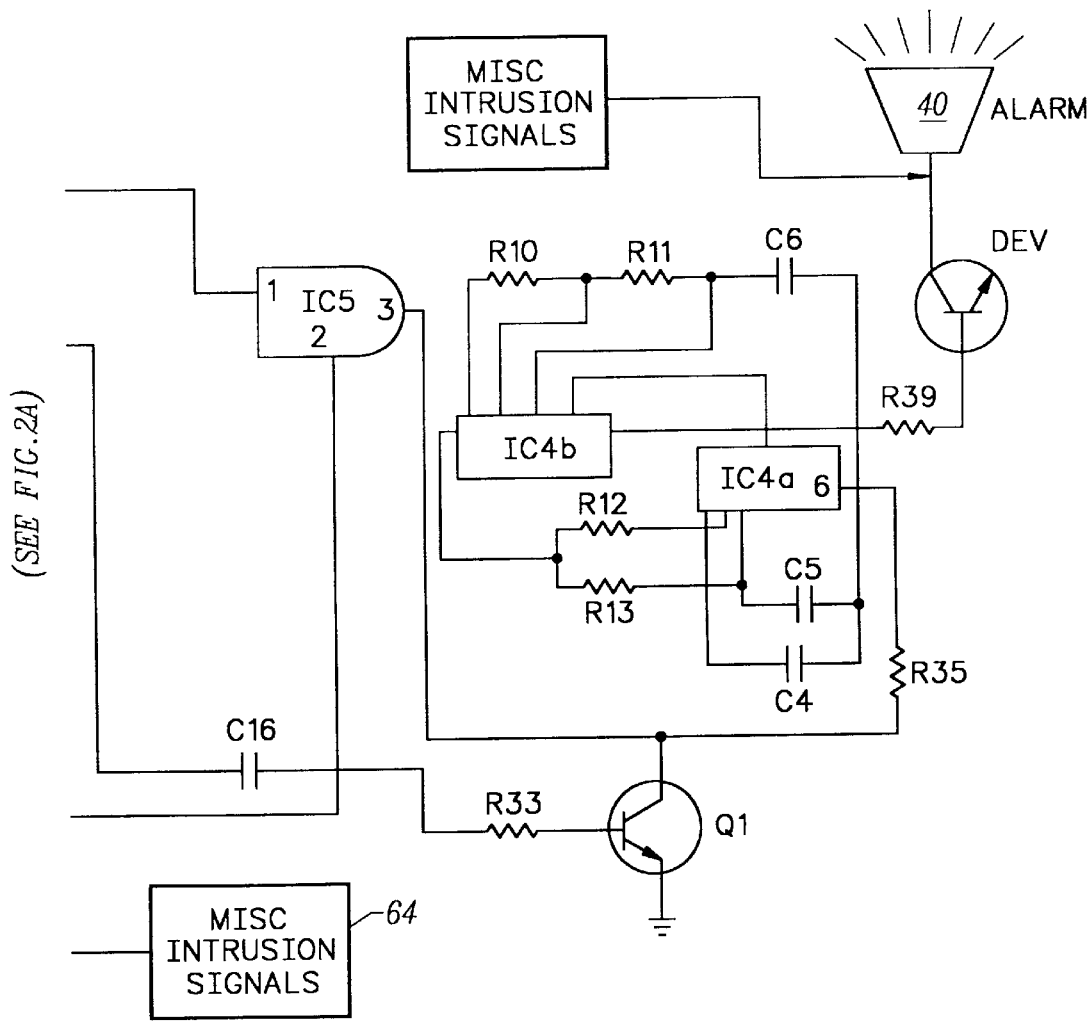

Turning to FIG. 2, it may be observed that a detailed electrical schematic is shown by which the alarm system 10 of the present invention operates. Living entity 58, such as a child or a pet, emits sound waves 60 which are received by microphone or sound sensor 20. Microphone 20 receives audio signals 60 from living entity 58, within vehicle 12. Typically, entity 58 may be a human child or a pet. Microphone 20 receives the audio signal and transduces the same into an electrical signal which is sent to integrated circuit LN324, noted in FIG. 2 by the designation by IC2, followed by a lower case letter. Essentially, IC2 consists of four operating amplifiers. The electrical signal from microphone 20 passes through coupling capacitor C20. A pulldown resistor R14, and resistors R15, R16, and capacitor C18 tune the input at the negative leg to IC2a. Capacitor C8 serves as a frequency compensation for IC2a. In other words, capacitor C8 permits microphone 20 to discriminate on a frequency basis. For example, C8 may be preset to react to higher pitch sounds typically emitted by a child. The output of IC2a serves as an input to IC2c. RV3 adjusts the bias point of amplifier IC2c and also serves as a negative input to the same. The output of IC2a couples to IC3a via capacitor C9 which functions as a coupling capacitor. R18, R19, R20, R21, C10, C11, and C12 becomes an AC to DC converter in conjunction with diode D1. The output signal of IC3a passes to IC2c, a comparator. Again, the adjustable resistor RV3, in conjunction with a minimum level resistor R17, inputs to IC2c. The output of IC2c passes to IC5 which is a logic circuit. In other words, IC5 is an AND gate, the input from IC2c passing to pin 2 of the same.

Temperature sensor 14 receives heat in vehicle 12, depicted by plurality of waves 62. Temperature sensor 14, in form of a thermistor, is used in conjunction with the R1, R2, R3, bridge circuit. When a particular high temperature level set by this bridge circuit is reached, thermistor 14 sends a signal to amplifier IC3d. Again, it should be noted that IC3 is a part of an integrated circuit, LM324. The other signal to IC3d passes from the node between R1 and R3. The output of IC3d is sent to comparitor IC3c. RV1 serves as the adjustment for the temperature sensitivity of thermistor 14. That is to say, when a certain temperature within vehicle 12 is reached, an output will egress from comparitor IC3c to AND gate IC5.

Thus, IC5 receiving the input from thermistor 14 and microphone 20 via the heretofore described circuitry, will produce an output at pin 3. Such output passes to IC4a and IC4b via limiting resistor R35. Pin 6 of IC4a serves as the trigger pin for the duration timer for the eventual sound emanating from alarm 40. R10–R13, as well as C4–C6, in conjunction with IC4 produce the appropriate pulsation and duration of such alarm signals. For example, C4 determines the duration of the alarm while C6 controls the pulsation of the alarm in concert with the resistors R10 and R11. DEV serves as a switching resistor for alarm 40.

Transistor Q1, capacitor C16, and resistor R33 couple the miscellaneous intrusion signals 64 from a conventional vehicle alarm, i.e., unauthorized door ajar. C15 limits such intrusion signal or signals to the positive input of IC3b.

The following is a list of components which are typically employed in the circuitry shown in FIG. 2.

LIST OF COMPONENTS

| ITEM | |
|---|---|
| C4, C5 | 47 $\mu$F, 25 v, Electrolytic |
| C6 | 1.0 $\mu$F, 25 v, Electrolytic |
| C8 | 1.0 $\mu$F, 20% Polyester |
| C9, C10 | 1.0 $\mu$F, 20%, Polyester |
| C11, C16 | 1.0 $\mu$F, 20%, Electrolytic |
| C12, C15 | 10 $\mu$F, 20%, Electrolytic |
| G-20 | 10 $\mu$F, 20%, Polyester |
| Q-1 | 2N2222A Bipolar |
| DEV | Padipad |
| IC-2, IC-3 | LM324 Op Amp |
| IC-4 | NE 556 Linear |
| IC-5 | 4011 CMOS |
| R1, R2, R3 | 4.6 K$\Omega$ C. Film 0.25 w Fixed. |
| R4, R5 | 100 K$\Omega$ C. Film 0.25 w Fixed. |
| R6 | 649 K$\Omega$ C. Film 0.25 w Fixed |
| R8 | 10 K$\Omega$ C. Film 0.25 w Fixed |
| R10 | 680 K$\Omega$ C. Film 0.25 w Fixed |
| R11 | 330 K$\Omega$ C. Film 0.25 w Fixed |
| R12 | 5.1 M$\Omega$ C. Film 0.25 w Fixed |
| R13 | 20 K$\Omega$ C. Film 0.25 w Fixed |
| R14 | 4.70 M$\Omega$, 5%, C. Film 0.25 w Fixed |
| R15 | 20 K$\Omega$, 5%, C. Film 0.25 w Fixed |
| R16 | 10 K$\Omega$, 5%, C. Film 0.25 w Fixed |
| R17 | 1 K$\Omega$, 5%, C. Film 0.25 w Fixed |
| R18 | 330 K$\Omega$, 5%, C. Film 0.25 w Fixed |
| R19 | 5.1 M$\Omega$, 5%, C. Film 0.25 w Fixed |
| R20, R35 | 100 K$\Omega$, 5%, C. Film 0.25 w Fixed |
| R21 | 200 K$\Omega$, 5%, C. Film 0.25 w Fixed |
| R22 | 510 K$\Omega$, 5%, C. Film 0.25 w Fixed |
| R23 | 2 M$\Omega$, 5%, C. Film 0.25 w Fixed |
| R33 | 3.3 K$\Omega$, 5%, C. Film 0.25 w Fixed |
| R39 | 680 $\Omega$, 5%, C. Film 0.25 w Fixed |
| RV1 | 20 K$\Omega$, ¼ w H. Mini Carbon Trim Pot |
| RV2 | 20 K$\Omega$, 15% H. Mini Carbon Trim Pot |
| RV3 | 10 K$\Omega$, 20% H. Carbon, Trim Pot |
| RV4 | 20 K$\Omega$, 20% H. Mini Carbon, Trim Pot |
| D-1 | 1N4148 |
| Thermistor 14 | Thermout |
| Microphone 20 | Mikout |

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An alarm system for the interior vehicle, comprising:
   a. temperature sensor means for measuring the temperature of the interior of the vehicle and producing a signal representative of preselected level of said measured temperature;
   b. a sound detector, said sound detector producing a signal representative of a preselected level of sound intensity and at a preselected level of sound pitch, corresponding to sound produced by a living entity within the interior of the vehicle;
   c. AND gate means for receiving said signals from said temperature sensor means and said sound detector, said AND gate means generating an output signal upon receipt of said temperature sensor means and sound detector signals; and
   d. alarm means for producing an alert, said alarm means triggered by said AND gate means output signal.

2. The alarm system of claim 1 in which said sound detector includes means for adjusting the threshold of sound intensity necessary to produce said signal representative of a certain sound intensity.

3. The alarm system of claim 1 which additionally comprises timer means for maintaining said alert for a predetermined period of time following triggering of said alarm means by said AND gate means output signal.

4. The alarm system of claim 3 in which said timer means additionally comprises latching means for providing a continuous signal to said alarm means during said predetermined period of time following triggering of said alarm means.

5. The alarm system of claim 1 in which said alarm means produces an audio alert.

6. The alarm system of claim 5 which additionally comprises means for pulsating said audio alert.

7. The alarm system of claim 5 in which said sound detector includes means for adjusting the threshold of sound intensity necessary to produce said signal representative of a certain sound intensity.

8. The alarm system of claim 7 which additionally comprises timer means for maintaining said alert for a predetermined period of time following triggering of said alarm means by said AND gate means output signal.

9. The alarm system of claim 8 in which said timer means additionally comprises latching means for providing a continuous signal to said alarm means during said predetermined period of time following triggering of said alarm means.

10. The alarm system of claim 1 in which said sound detector produces a signal according to sound at a certain pitch as well as to sound of a certain intensity within the interior of the vehicle.

11. The alarm system of claim 10 in which said sound detector further includes adjustment means to determine the pitch of the sound to which said sound detector produces a signal.

* * * * *